(12) United States Patent
Shaw et al.

(10) Patent No.: US 6,359,241 B1
(45) Date of Patent: Mar. 19, 2002

(54) INTEGRATED SENSOR AND MEMORY DEVICE FOR MEMORIZING SPATIAL DOMAIN EVENT AND CORRESPONDING TIME DOMAIN INFORMATION

(76) Inventors: Venson M. Shaw; Steven M. Shaw, both of 111 Reldyes Ave., Leonia, NJ (US) 07605

(*) Notice: Subject to any disclaimer, the term of this patent is extended or adjusted under 35 U.S.C. 154(b) by 0 days.

(21) Appl. No.: 08/986,291

(22) Filed: Dec. 6, 1997

Related U.S. Application Data

(63) Continuation-in-part of application No. 08/208,992, filed on Mar. 11, 1994, now Pat. No. 5,745,598.
(51) Int. Cl.[7] ............................................. G08C 21/00
(52) U.S. Cl. .................................. 178/18.07; 178/18.07
(58) Field of Search .......................... 178/18.1, 18.01, 178/18.03, 18.05, 18.06, 18.07, 19.01, 19.03, 19.04; 345/173, 174, 179

(56) References Cited

U.S. PATENT DOCUMENTS 5,043,710 A * 8/1991 Rydel .......................... 345/174

* cited by examiner

*Primary Examiner*—Vijay Shankar

(57) ABSTRACT

An integrated sensor and memory device for sensing, capturing, and memorizing spatial and/or time domain distribution of events, comprises a sequence of events; an array of cells for sensing and capturing spatial and/or time domain distribution of each event; source for charging/loading signal coupled to each cell, wherein each charging/loading signal provides a suitable magnitude to correspond with an elapsed time mark of each event; and memory cell integrated within each cell, that memorize current value of charging/loading signal at the moment of cell activation, which correspond with the time instance when an event happens.

23 Claims, 8 Drawing Sheets

INTEGRATED SENSOR AND MEMORY DEVICE FOR MEMORIZING SPATIAL DOMAIN EVENT AND CORRESPONDING TIME DOMAIN INFORMATION

This application is a continuation-in-part of copending application Ser. No. 08/208,992 filed on Mar. 11, 1994 now U.S. Pat. No. 5,745,598.

BACKGROUND OF THE INVENTION

1. Field of the Invention

This invention is directed in general to a system for sensing and memorizing spatial and time-domain distribution of measurable events, and more particularly to a system which employs an array of contact cells (sensor elements) to provide an indication of spatial and time-domain distribution of events on a surface.

2. Description of the Background Art

The existing systems measuring distribution of events on a surface (including tactile sensors) are devices consisting of an array of cells (mechanical, electrical, optoelectronic, magnetic, pneumatic, etc.) capable of sensing contacts with external objects, and in some cases capable of measuring magnitude of these contacts. Even if memory devices are incorporated into these cells, a system can only memorize spatial distribution of sensed events. For example, this can be used in touch-sensitive pads to create digital copies of hand-written signatures. However, the system itself cannot memorize the dynamic (time-domain) properties of the sensed events, i.e. it is impossible to extract from the content of the memory in what sequence the cells have been activated (contacted). As a result, the system requires support of auxiliary devices (usually a control unit and external memory buffers) for memorizing time-domain distribution of sensed events. Examples of such devices are disclosed in U.S. Pat. Nos. 4,441,097, 4,953,410, 5,010,772 and 5,325,442. This solution requires complex wiring and control. The manufacturing cost of such devices becomes inhibitively high and therefore limited only to restricted areas of applications.

It would therefore be highly desirable to improve the existing systems and methods for sensing, capturing, and memorizing time-domain and spatial distribution of events for including particular technological innovations to eliminate the significant disadvantages as stated earlier, and to further improve the overall system performance.

SUMMARY OF THE INVENTION

Prior arts as illustrated by Anderson et.al can not function autonomously to memorialize the spatial events and require further external support of timer clock, current meter and address decoder circuit. Namely, the tactile sensor as shown in the prior arts can be understood as a two dimensional grid array wherein each grid location comprises a capacitor cell. During the human contact of a selective grid location, capacitor cell will be charged or discharged according to the characteristic of the power source. Furthermore, since a current will be injected across the wire pair which interconnect the grid location, a current meter and a address decoding circuit will be employed in order to measure and identify the contact grid location. Provided with external clock timer, said grid location can be memorialized along with the time instance when the contact is happening.

In our invention, each contact cell comprises a sensor, a controller, and at least one memory element, wherein during the moment when said sensor detects a contact event at that cell location, an impulse is being transmitted to said controller, and said controller uses said impulse as a control signal for allowing said memory element to store a charging signal at that moment of the contact event, wherein said charging signal is the output from a binary counter, input of said counter is triggered by a clock generator, therefore by setting a suitable clock frequency according to the requirement of said contact event, magnitude of said charging signal can change proportionally according to the elapse of the time. Accordingly said memory element can store a charging signal representing time coordinate of said contact event. Likewise, the magnitude of said charging signal can change proportionally to the magnitude of said contact event, therefore a second memory element at that cell location would be able to store a charging signal representing spatial domain coordinate of said contact event.

The distinctive advantages of our invention is that, in a natural sensing environment, e.g., pressure sensing of a wind tunnel, power consumption need to be conserved, our invention provides a low cost alternative to sense and preserve spatial event and the time domain information without the requirement of external timer clock, address decoding circuit, and current meter.

It is therefore an object of the present invention to provide an improved system which employs an array of contact cells (sensor elements) to sense, capture, and memorize spatial and time-domain distribution of contact events.

It is further an object of the present invention to apply said system for a wide range of contact events including those being a result of mechanical, pneumatical, optical, electrical, acoustic, magnetic, or alike action.

It is further an object of the present invention to improve said system for autonomous maintaining said memorized contact events without any memory device or control unit being external to said contact cells.

It is still further an object of the present invention to utilize said system for extracting and measuring dynamic description including acceleration, speed, or alike for said memorized contact events.

It is still further an object of the present invention to allow said improved system for a multiple dimensional implementation.

These and other objects and advantages are provided by:
(i) incorporating into the said system a source of charging/loading signal, which generates a signal changing correspondingly to the elapsed time and/or correspondingly to the number of sensed contact events;
(ii) incorporating into said contact cells a memory device which memorizes the current value of the said signal at the moment of cell activation (contact event).

Optionally, a second memory device can be incorporated into said contact cells in order to memorize magnitude of sensed contact events.

Once the data have been memorized, the system can preserve and maintain data for quite a long period without any external connection.

If adequate material technology can be applied, the system can be manufactured in extremely economical, miniaturized and robust manner, and therefore applicable for wide range of application.

Since the system memory preserves both the time-domain and spatial co-ordinates of sensed contact events, it is possible to extract a detailed dynamic description of the registered phenomena. For example, the speed and acceleration of a pen drawing hand-written images can be measured.

DESCRIPTION OF THE ILLUSTRATED EMBODIMENT

In the following description, particular reference is made to the digital implementation of the invention in the context of measuring the spatial and time-domain distribution of the contacts exerted by a sharp mechanical device (e.g. a pen) on a planar surface. It is envisaged, however, that the practical applications of the invention can be extended to many other areas in which knowledge of spatial and time-domain distribution of contact events would be useful. It is further envisaged that in the following description selected digital components can be substituted by the corresponding analog components without changing principles of the invention.

Figure 1:
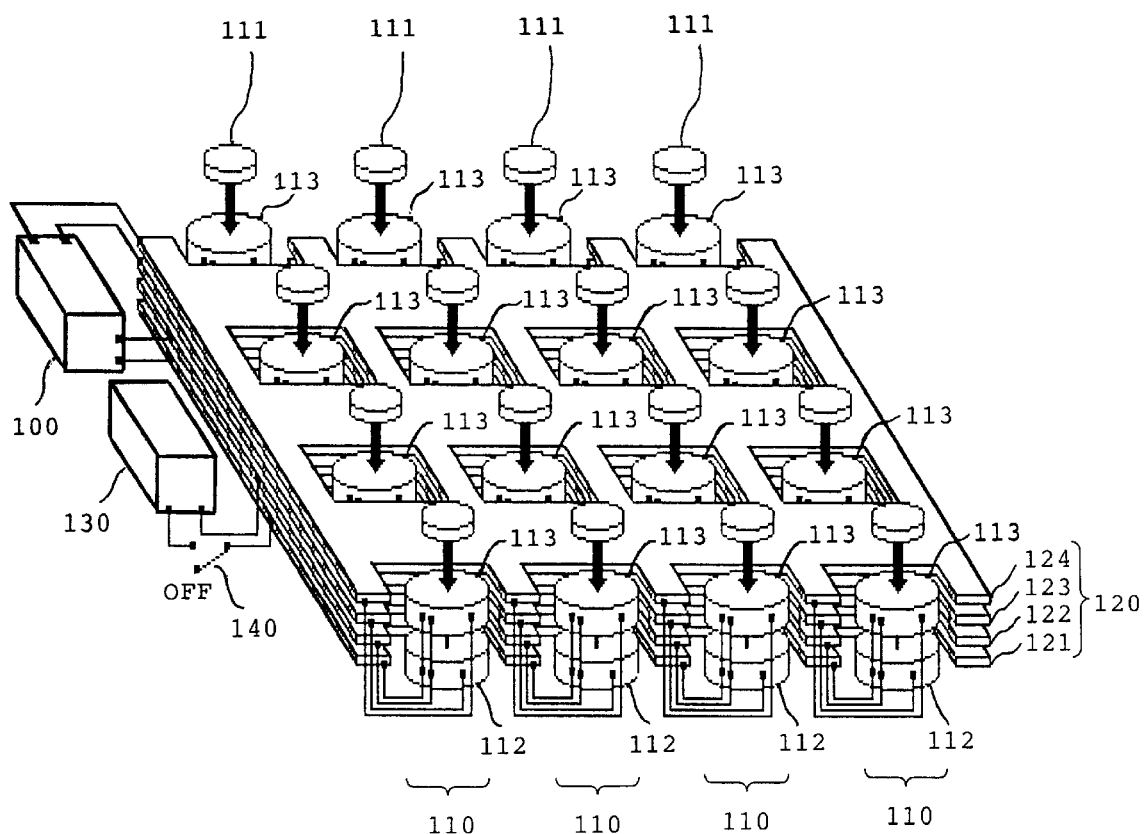
FIG. 1 is a general perspective view of an example of our invention where the layout of contact cells is a two-dimensional array.

Referring to FIG. 1, the present invention is comprised of three main parts: a source of charging/loading signal 100, an array of contact cells 110 (incorporating a sensing element 111, a memory device 112, and a control circuit 113), and conductive layers 120 isolated from each other. These are: a power supply layer 121, a ground layer 122, a charging/loading signal layer 123, and (optionally) a clock signal layer 124. The arrangement of the array, the layout of the layers, and the number of contact cells depends on specific application requirements. A power supply source 130 and an ON/OFF switch 140 are also incorporated into the invention.

Figure 2:
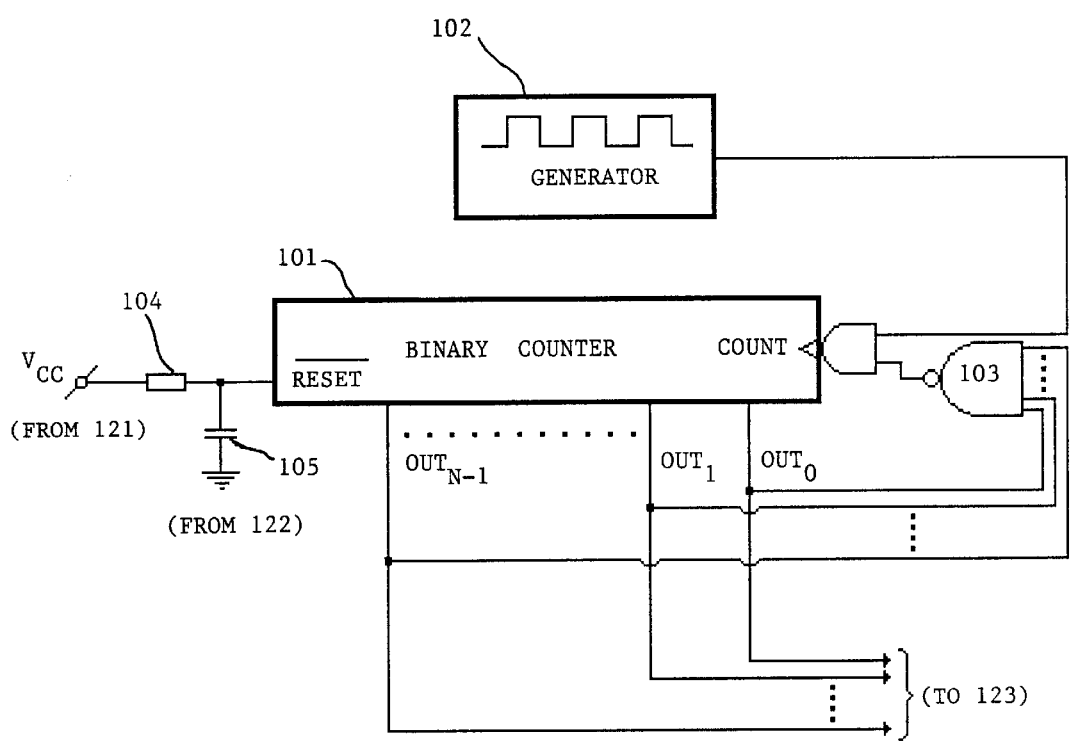
FIG. 2 shows an example of a source of charging/loading signal where the signal is represented by a n-bit number, and the magnitude of the signal changes proportionally to the elapse of time.
Figure 3:
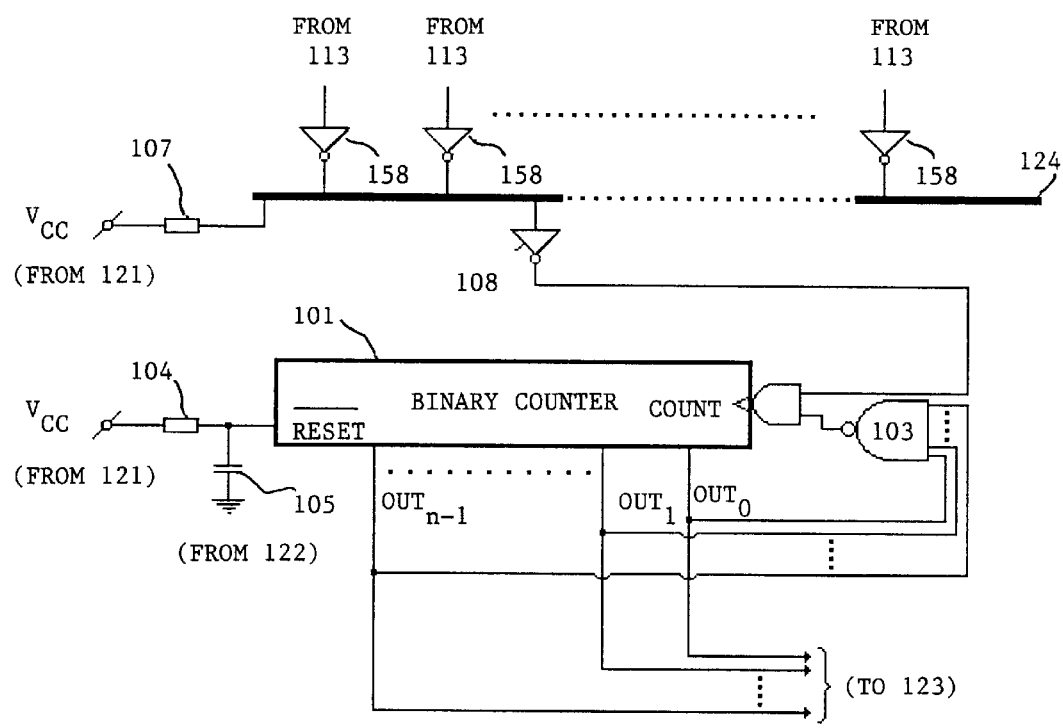
FIG. 3 shows an example of a source of charging/loading signal where the signal is represented by a n-bit number, and the magnitude of the signal changes proportionally to the number of detected contact events.

Referring to FIG. 2 and FIG. 3; the source of charging/loading signal 100 consists of a n-bit binary counter 101 which is reset (using the resistor 104 and the capacitor 105) when the system is switched on. The output of the counter 101 is connected to the charging/loading signal layer 123 so that the charging/loading signal is a n-bit binary signal, and the charging/loading signal layer 123 is a n-bit digital bus. As shown in FIG. 2, the clock impulses triggering the counter 101 are generated by an generator 102 so that the magnitude of the charging/loading signal changes proportionally to the elapse of time. The interval between two consecutive increments of the signal's magnitude is determined by the frequency of the generator 102. The solution shown in FIG. 2 does not utilize the clock signal layer 124.

Figure 7:
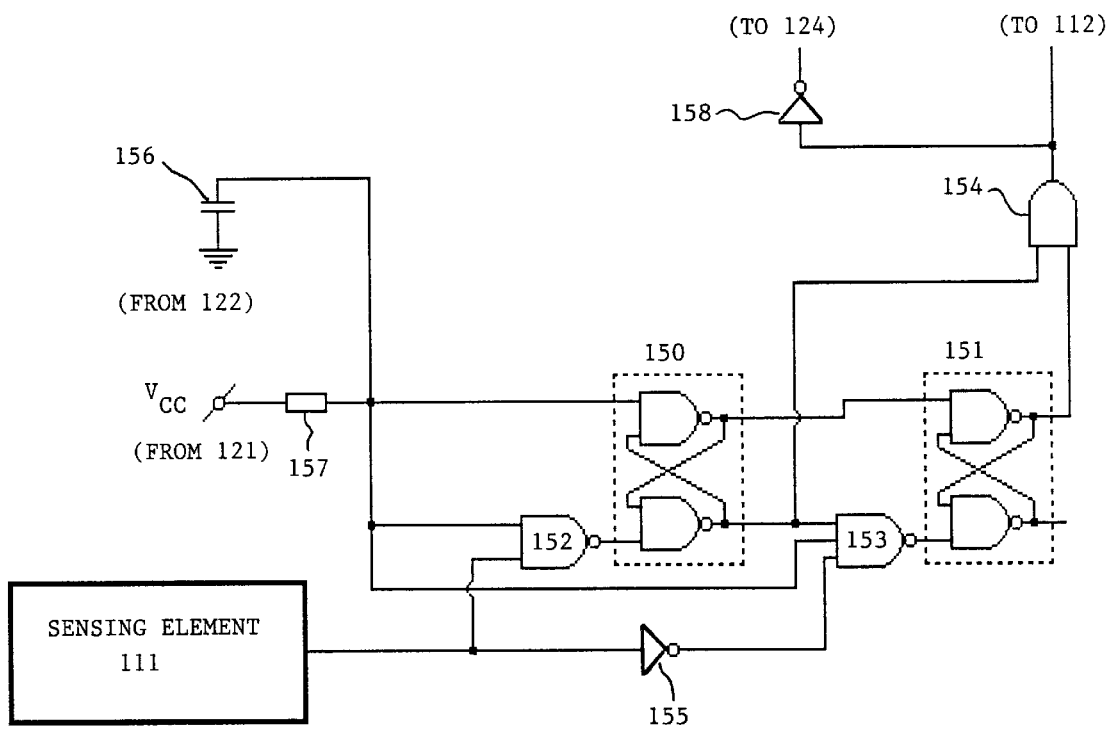
FIG. 7 shows an example of a control circuit incorporated into a contact cell where the first contact event detected by the contact cell is memorized.

An alternative solution is shown in FIG. 3 where the clock impulses triggering the counter 101 are received from the clock signal layer 124. The impulses appearing on the clock signal layer 124 are received from the gates 158 which belong to the control circuits 113 (as shown in FIG. 7) of the contact cells 110. The gates 158 should be of the open-collector type or a similar one allowing multiple connection to the common bus. The resistor 107 is necessary only if the gates 158 are of the open-collector type. Since the impulses received from the gates 158 represent the contact events detected by the corresponding contact cells 110, the magnitude of the charging/loading signal changes proportionally to the number of detected contact events. The interval between two consecutive increments of the signal's magnitude is a random value.

When the content of the binary counter 101 reaches the maximum value $2^n-1$, the NAND gate 103 closes the clock input of the counter 101, and there is no further increase of the charging/loading signal (the systems becomes saturated).

Figure 4:
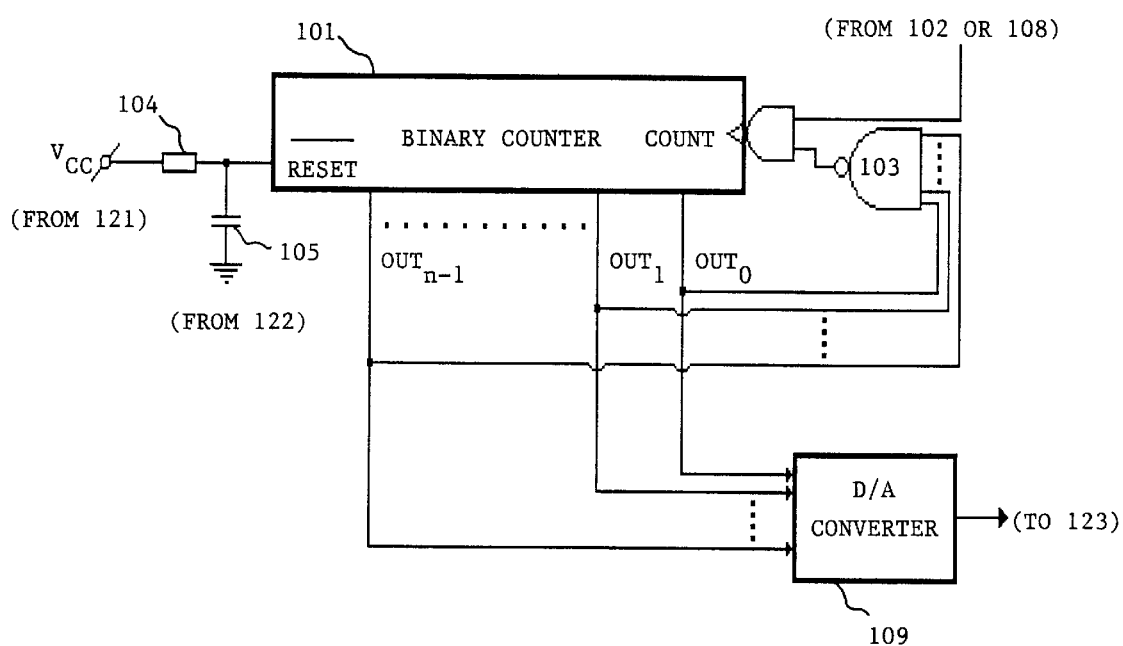
FIG. 4 shows an alternative representation of the charging/loading signal where the signal is represented by an analog value being converted from a n-bit digital signal using a D/A converter.

FIG. 4 shown an alternative implementation of the charging/loading signal. The output of the binary counter 101 is converted by a D/A converter 109 so that the charging/loading signal becomes an analog signal, and the charging/loading signal layer 123 is an analog bus.

Figure 5:
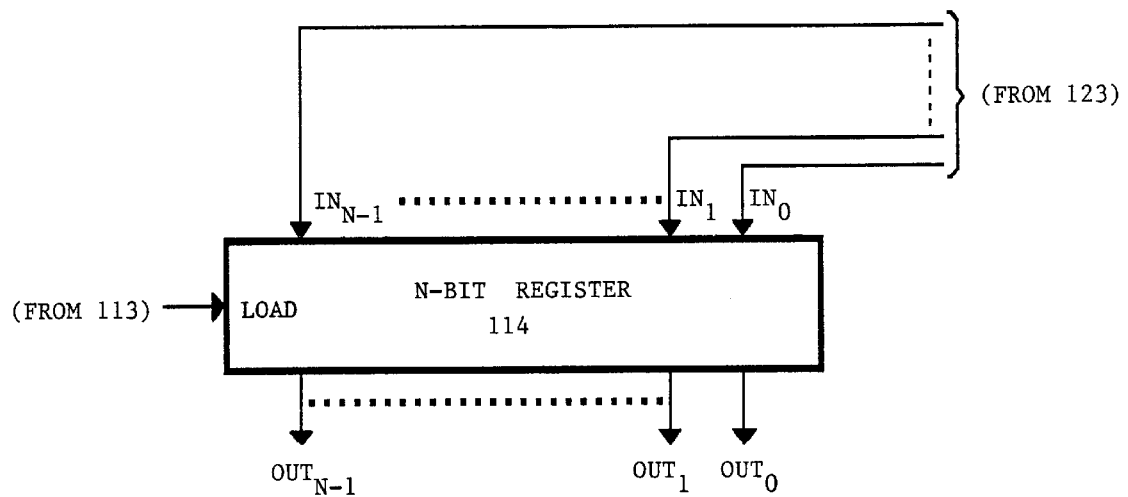
FIG. 5 shows an example of a digital memory device incorporated into a contact cell.

Referring to FIG. 5, the memory device 112 of a contact cell 110 is a n-bit digital register 114 connected to the charging/loading signal layer 123 being a n-bit digital bus (as shown in FIG. 2 and FIG. 3). The register 114 is loaded through the use of an loading impulse received from the control circuit 113.

Figure 6:
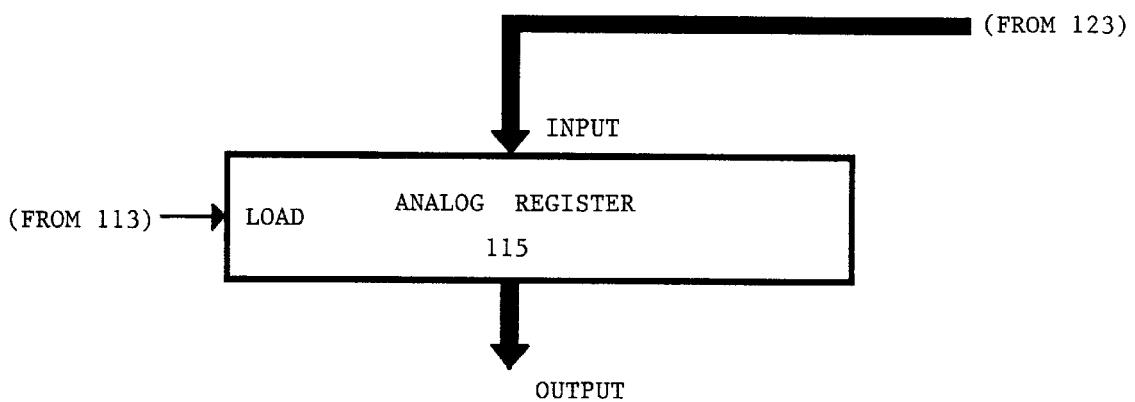
FIG. 6 shows an example of an analog memory device incorporated into a contact cell.

An alternative solution is shown in FIG. 6 where the memory device 112 of a contact cell 110 is an analog register 115 connected to the charging/loading signal layer 123 being an analog bus (as shown in FIG. 4). Similarly, the register 115 is loaded through the use of an loading impulse received from the control circuit 113.

Referring to FIG. 7, the control circuit 113 of a contact cell 110 consists of two flip-flops 150, 151, the gates 152, 153, 154, 155, the capacitor 156, and the resistor 157. The gate 158 (which should be of the open-collector type or a similar one allowing multiple connection to the common bus) is required only if the clock signal layer 124 is incorporated into the system (as shown in FIG. 3).

The purpose of the resistor 157 and the capacitor 156 is to set the initial state of the flip-flops 150, 151 when the system is switched on. The flip-flops 150, 151 are in the initial state until an impulse representing a sensed contact event is received from the sensing element 111. Then an output impulse is send to the output gates 154 and 158, which lasts as long as the impulse received from the sensing element 111. Then the flip-flops 150, 151 are set into the terminal state in which no impulses can be send to the output gates 154 and 158. While in the terminal state the flip-flops 150, 151 cannot be switched again so that any other contact event sensed by the corresponding sensing element 111 is neglected. Therefore, the memory device 112 would memorize the time-domain coordinate of the first contact event sensed by the corresponding sensing element 111. If the system incorporates the clock signal layer 124, in this solution it is assumed that no more than one contact events can simultaneously happen. Otherwise, several impulses received from the gates 158 can overlap creating a single clock impulse in the clock signal layer 124 (as shown in FIG. 3).

Figure 8:
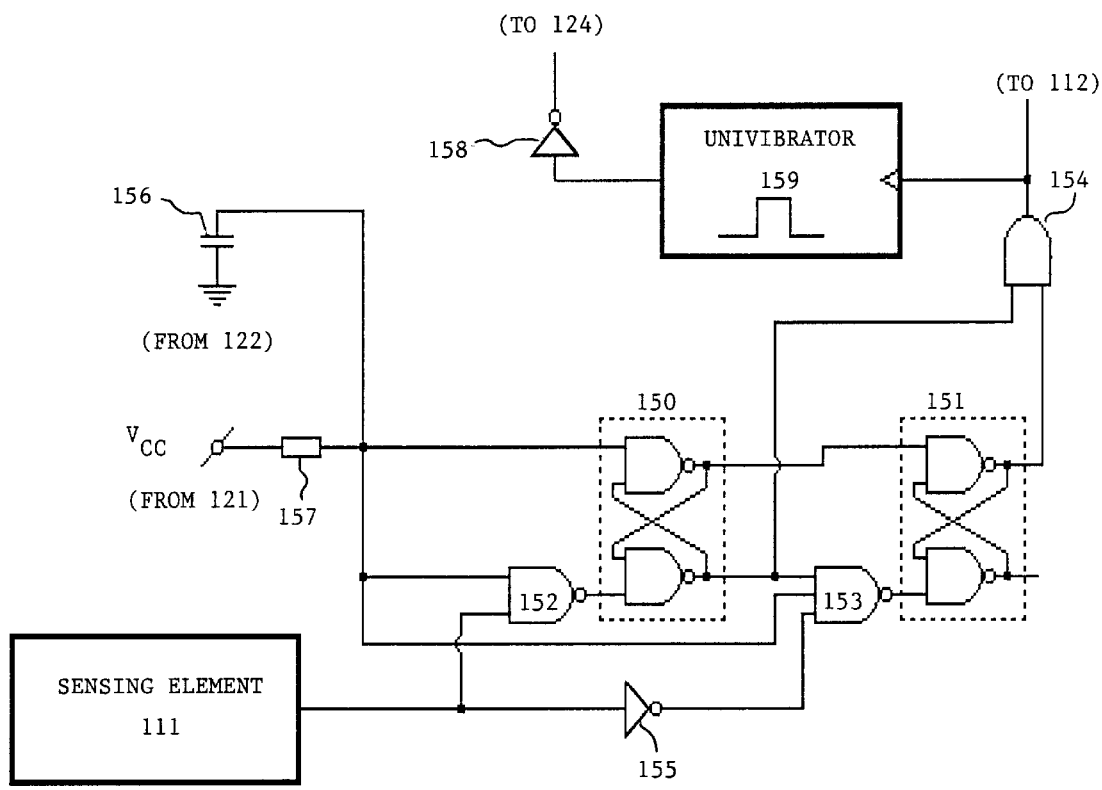
FIG. 8 shows an example of a control circuit incorporated into a contact cell where several contact cells can be simultaneously activated.

An alternative solution is shown in FIG. 8 where several sensing elements 111 can be simultaneously activated. The univibrator 159 is being added so that the length of the output impulses not depend on the duration of the contact event. Therefore, even if several contact events start almost at the same moment and then they are simultaneously sensed, the corresponding output impulses can be short enough not prevent their overlapping.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An integrated circuit device for sensing, capturing, memorizing, and preserving spatial and/or time-domain distribution of external events for a long lasting time period without external support, said device comprising:
   a sequence of external events;
   an array of cells for sensing and capturing spatial and/or time-domain distribution of selective one or plurality of said extend events;
   a source means of charging/loading signal coupled to said cells, said source means produces a sequence of charging/loading signals, wherein each of a plurality of charging/loading signal provide a suitable magnitude to correspond an elapsed time mark with each of said external event;
   a memory means for memorizing a present value of said charging/loading signal at a moment of cell activation, which correspond with the time instance when said external event happens, and
   a means for preserving and maintaining said present value of said charging/loading signal for a long time period without any external support.

2. An integrated circuit device in accordance with claim 1, wherein a device can autonomous maintain said memorized external events without any memory device, decoding logic, or control logic unit being external to said cells.

3. An integrated circuit device in accordance with claim 1, wherein each of said signals provide with a suitable magnitude corresponding to a number of sensed external events.

4. An integrated circuit device in accordance with claim 1, wherein optionally, a second memory device can be incorporated into said cells in order to memorize magnitude of a plurality of external events.

5. An integrated circuit device in accordance with claim 1, wherein said device can be applied for a wide range of external events being a result of mechanical, pneumatical, optical electrical, acoustic, thermal, and/or magnetic action.

6. An integrated circuit sensor and memory device in accordance with claim 1, wherein said device can measure, record, and/or extract dynamic description including acceleration, speed for said memorized external events.

7. An integrated sensor and memory device in accordance with claim 1, wherein said device can implement as a multiple dimensional device.

8. An integrated circuit device in accordance with claim 1, wherein said device measure, record, and preserve magnitude of said contact.

9. An integrated sensor and memory device in accordance with claim 1, wherein said device allows a cell to be activated when said cell being contacted by an external object.

10. An integrated sensor and memory device in accordance with claim 9, wherein said device further allows a cell to be activated when said cell being influenced or indirectly contacted by a logical object including radio wave, electronmagnetic wave, infarad ray, and/or x-ray.

11. An integrated circuit device in accordance with claim 9, wherein said device allows a cell to be activated upon detecting a time and/or spatial domain external event on a surface.

12. An integrated circuit device in accordance with claim 11, wherein said device allows a cell to be activated upon detecting an external event on a surface with any shape or contour.

13. An integrated circuit device in accordance with claim 12, wherein said device further allows a suitable multi-dimensional implementation for detecting and memorizing time and/or spatial domain external event on a surface of any shape or contour.

14. An integrated sensor and memory device in accordance with claim 1, wherein said device record and preserve a time sequence of those cells being activated.

15. An integrated sensor and memory device in accordance with claim 1, wherein said charging/loading signal can be encoded as a n-bit binary number, and magnitude of said number change in proportion to elapse of time.

16. An integrated sensor and memory device in accordance with claim 1, wherein said charging/loading signal can be selectively encoded as any digital number representation according to an application requirement.

17. An integrated sensor and memory device in accordance with claim 1, wherein said charging/loading signal can be further encoded as any analog number representation according to an application requirement.

18. An integrated sensor and memory device in accordance with claim 1, wherein said device can further include a suitable analog-to-digital converter so that a digital representation can be converted to a suitable analog representation.

19. An integrated sensor and memory device in accordance with claim 1, wherein a suitable digital memory can be incorporated with said cell.

20. An integrated sensor and memory device in accordance with claim 1, wherein a suitable analog memory can be incorporated with said cell.

21. An integrated circuit device in accordance with claim 1, wherein said device further including a control circuit in said cell, wherein a first external event detected by said cell is being memorized.

22. An integrated circuit device in accordance with claim 1, wherein said device further including a control circuit in said cell, wherein a plurality external event detected by said cell are being memorized in their sequential order.

23. An integrated circuit device in accordance with claim 1, wherein said device further including a control circuit in said cell, wherein a plurality of cells can be simultaneously activated for capturing multiple external events at a same time instance.

* * * * *